United States Patent Office 3,632,742
Patented Jan. 4, 1972

3,632,742
METHODS FOR INCREASING THE RESORPTION OF MEDICAMENTS
Theodor Eckert, 44 Munster, Birkenweg 45, and Roland Seidel, 44 Munster, Konigstrasse 44, both of Munster, Germany
No Drawing. Filed Mar. 5, 1970, Ser. No. 16,974
Claims priority, application Germany, Mar. 5, 1969, P 19 11 279.9
Int. Cl. A61j 3/08
U.S. Cl. 424—37                                                    9 Claims

ABSTRACT OF THE DISCLOSURE

The resorption of medicaments in the alimentary tract is increased by mixing it with xanthine derivatives.

The invention relates to methods of enhancing the resorption of medicaments in the alimentary tract.

The resorption of medicaments as they are administered in capsules, for instance, is frequently inadequate in the alimentary tract, particularly if the medicaments do not dissolve easily in water or in the gastric or intestinal juices.

One object of the invention is to improve the resorption of medicaments generally.

In accordance with one aspect the invention consists in the introduction of the medicaments whose resorption is to be raised into a solution of 1,3-, 1,7-, or 3,7-dimethylxanthine or xanthine derivatives substituted or combined in the form of a complex or a salt in the 1-, 3-, and 7-position, in polyethylene glycol or polypropylene glycol or their mixtures. Of the substituents introduced into 1-, 3- and 7-position or the groups combined in the form of a complex or salt, at least one substituent or one group must have hydrophilizing properties. 1-, 3-, 7-trimethylxanthine (caffeine) is also suitable as a xanthine derivative. The xanthine derivatives can be used singly or as a mixture.

The following compounds are specific examples of xanthine derivatives which can be used in the invention.

(1) Derivatives of 1,3-dimethylxanthine (theophylline)

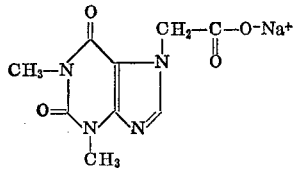

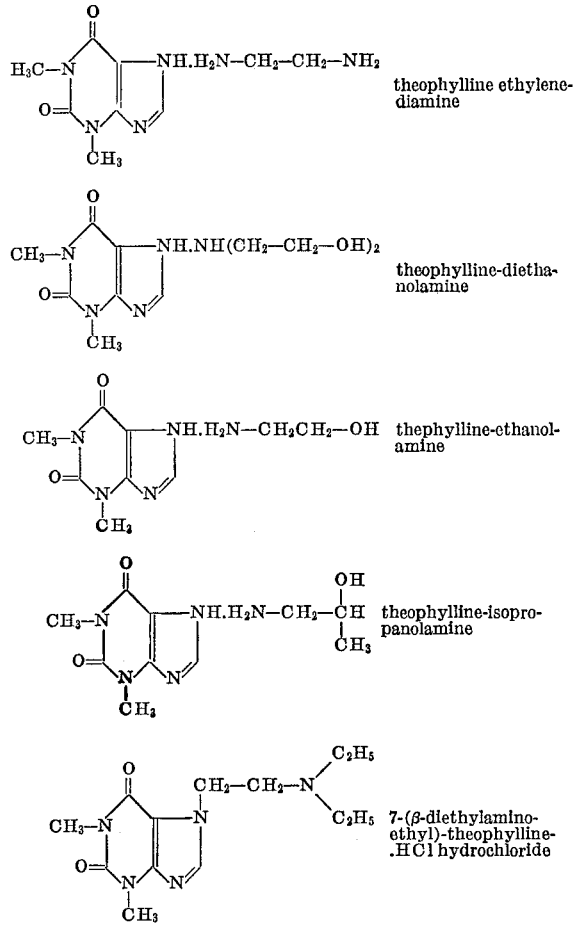

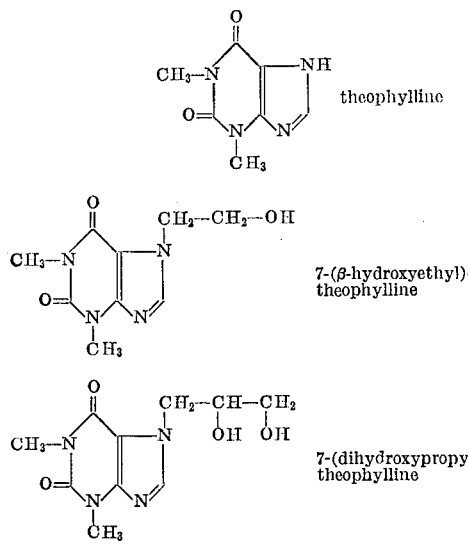

(2) Derivatives of 3,7-dimethylxanthine (theobromine)

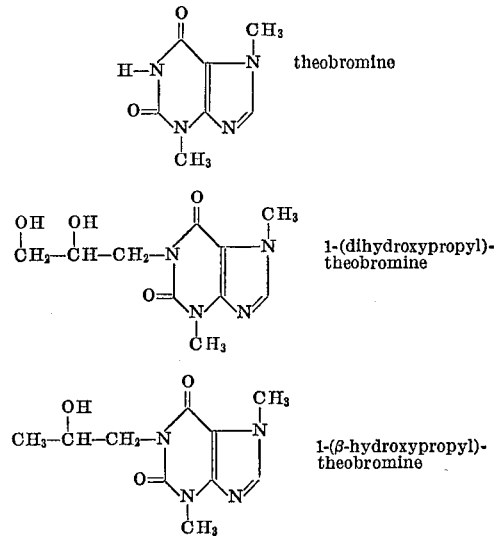

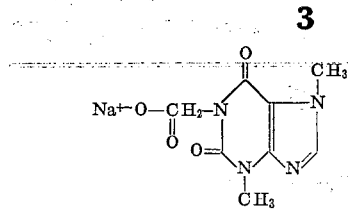

1-theobromine sodium acetate

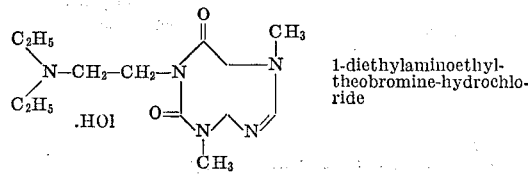

1-diethylaminoethyl-theobromine-hydrochloride (3) Derivatives of 1,7-dimethylxanthine (paraxanthine)

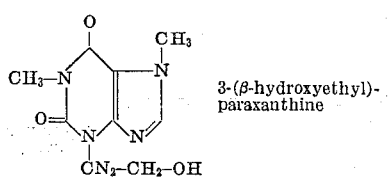

3-(β-hydroxyethyl)-paraxanthine (4) Other derivatives of xanthine

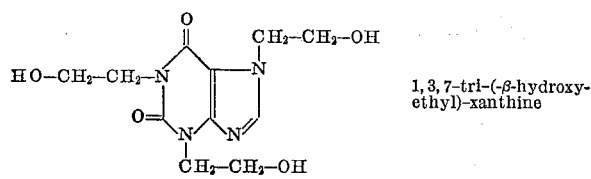

1,3,7-tri-(-β-hydroxyethyl)-xanthine

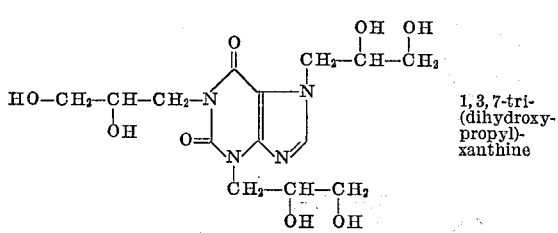

1,3,7-tri-(dihydroxypropyl)-xanthine

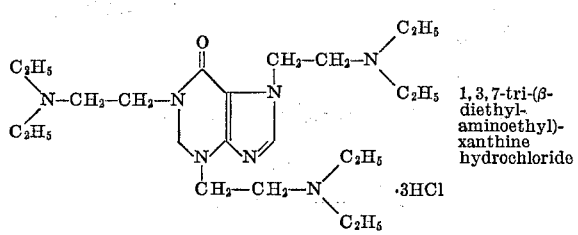

1,3,7-tri-(β-diethylaminoethyl)-xanthine hydrochloride

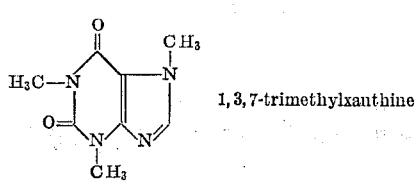

1,3,7-trimethylxanthine

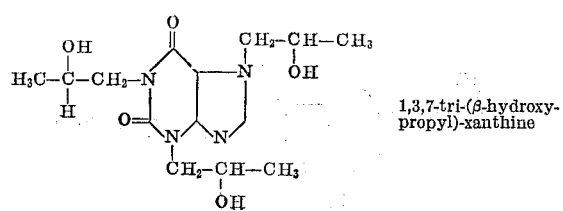

1,3,7-tri-(β-hydroxypropyl)-xanthine

Especially suitable xanthine derivatives are caffeine and those of the following general formula

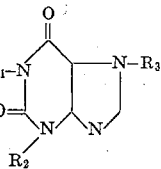

in which one of $R_1$, $R_2$ and $R_3$ denotes H, and the other two methyl, or $R_1$, $R_2$ and $R_3$ denote lower ($C_1$-$C_6$) alkyl of which at least one has at least one hydrophilizing group, preferably at least one OH or COOH group or its metal salt, particularly an alkali metal salt, or an $NH_2$—, $NHR_4$— or $NR_4R_5$— group, wherein $R_4$ and $R_5$, which can be identical or different, signify lower alkyl, especially methyl or ethyl, or its acid addition salt. The number of hydrophilizing groups per alkyl radical can lie between 1 and the number of carbon atoms in the alkyl radical concerned.

Of these compounds, the most easily accessible and hence most suitable for application are those in which two of the three of the named positions are each substituted by a methyl group.

A more specific group of xanthine derivatives which can be used are those where two of the three groups $R_1$, $R_2$ and $R_3$ each signify methyl and where at the third position a mono- or dialkylamine or -alkanolamine or an alkyldiamine with 1–6 C-atoms, preferably 2–4 C-atoms and especially with one OH group or a further amino group per alkyl group is combined in the form of a complex or a salt.

In hydroxyalkyl substituents the alkyl part preferably has 1–4 carbon atoms and 1–2 OH groups, or is a sugar radical.

Generally speaking, it can be said that the ratio of the number of alkyl carbon atoms to the number of hydrophilizing groups in the total substituent concerned should be 1:1 to 3:1 for practical purposes, i.e. 1 OH or COOH group, for example, per carbon atom to 1 OH or COOH group per 3 carbon atoms.

A compound containing carboxyl groups is normally used in the salt form, whereas xanthines substituted or complexed with basic groups are best used in the form of an acid addition salt, especially with mineral acids, for example halogen acids.

The most suitable solvents are polyethylene glycols of the formula

HO—$CH_2$—($CH_2$—O—$CH_2$)$_n$—$CH_2$—OH where $n$ is a whole number between 1 and 200. This corresponds to polyethylene glycols with molecular weights between 106 and 8862. A mixture of polyethylene glycols of different chain lengths can also be used. Other homologous glycols, such as polypropylene glycols of the formula

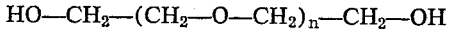

in which $n$ is a whole number between 1 and 150 and the molecular weight therefore lies between 134 and 8800, are also suitable. Here again, mixtures of polypropylene glycols of different chain lengths, can be used. A mixture of polyethylene glycol(s) and polypropylene glycol(s) can however also be used. The xanthine derivatives must be soluble in the polyglycol used or in mixtures of the above polyglycols.

In practical use polyethylene glycols with molecular weights between about 300 and 4000 and polypropylene glycols with molecular weights between about 400 and 1000 have shown themselves to be particularly suitable.

It can be assumed that the xanthine derivatives dissolved in this way form soluble complexes with the added medicaments, the effect of which is to raise the resorption of the medicament—particularly in the case of oral or rectal administration. The xanthine derivatives not only cause an increase in the solubility of the medicaments which are otherwise hard to dissolve, but also seem to entrain them during resorption. The xanthine derivatives used in accordance with the invention therefore act in this way as agents enhancing resorption.

The invention is particularly suitable for medicaments administered orally or rectally in capsules. The invention will be further explained by the following examples.

EXAMPLE 1

0.4 g. 7-(dihydroxypropyl)-theophylline and 0.4 g. 1-($\beta$-hydroxypropyl)-theobromine are dissolved in 10 g. of a mixture of 9.8 g. polyethylene glycol 400 and 0.2 g. polyethylene glycol 4000. 2.5 g. micronized griseofulvin are introduced into this solution.

EXAMPLE 2

0.4 g. 1-(dihydroxypropyl)-theobromine and 0.4 g. 7-(dihydroxypropyl)-theophylline are dissolved in 10 g. polyethylene glycol 400. 500 mg. micronized spironolactone are introduced into this solution.

EXAMPLE 3

1.0 g. 1-theobromine sodium acetate are dissolved in 10 g. polyethylene glycol 600. 10 mg. k-strophantine are introduced into this solution.

EXAMPLE 4

1.0 g. 7-($\beta$-diethylaminoethyl)-theophylline hydrochloride is dissolved in 10 g. polypropylene glycol 600. 160 mg. L-3-methoxy-$\omega$-(1-hydroxy-1-phenyl-isopropylamino)-propiophenone hydrochloride are introduced into this solution.

EXAMPLE 5

0.8 g. 1,3,7-tri-(dihydroxypropyl)-xanthine is dissolved in a mixture of 7.0 g. polyethylene glycol 300 and 3.0 g. polypropylene glycol 600. 100 mg. testosterone are introduced into this solution.

EXAMPLE 6

0.8 g. theophylline-diethanolamine is dissolved in 10 g. polyethylene glycol 400. 2.5 g. micronized griseofulvin are introduced into this solution.

EXAMPLE 7

1 g. 1,3,7-tri-(dihydroxypropyl)-xanthine and 1 g. 1,3,7-tri-($\beta$-hydroxypropyl)-xanthine are dissolved in a mixture of 9.8 g. polyethylene glycol 400 and 0.2 g. polyethylene glycol 4000. 500 mg. rutin are introduced into this solution.

The evidence for the resorption promoting effect of the xanthine derivatives was shown on two compounds each representative for its class of substances. These are rutin (flavonoid), prednisolone (steroid).

EXAMPLE 8

Rutin

Rutin is sparingly soluble in water. Since rutin has neither acute or chronic toxicity even in high dosages, the experiments were carried out on human beings. Rutin is rapidly metabolized in the human body. The main metabolite appearing in the urine is 3,4-dihydroxyphenyl acetic acid.

The resorption-promoting effect of the xanthine derivatives was proved in the following experiments by the fact that the elimination of this metabolite (3,4-dihydroxyphenyl acetic acid) in the case of such preparations which were produced in accordance with the invention with xanthine derivatives was greatly increased. The increase in the resorption is shown by a comparison with a preparation produced according to the same specifications but without a xanthine derivative.

Performance of the tests

The experiments were carried out with two kinds of gelatine capsules containing different rutin solutions.

(1) Control gelatine capsules

| | Mg. |
|---|---|
| Rutin | 150 |
| Dissolved in polyethylene glycol 400 ad | 600 |

(2) Gelatine capsules with resorption promoting agent

| | Mg. |
|---|---|
| Rutin | 150 |
| $\beta$-hydroxypropyl theobromine | 75 |
| $\beta$-hydroxypropyl theophylline | 75 |
| Dissolved in polyethylene glycol 400 ad | 600 |

Three healthy male subjects between the ages of 25 and 29 years were used in the tests. Both types of capsules were swallowed by the subjects on an empty stomach. The urine was collected until the excretion of 3,4-dihydroxyphenyl acetic acid had ended.

Determination of 3,4-dihydroxyphenyl acetic acid

The fresh urine was acidified with diluted hydrochloric acid and extracted with ether. The 3,4-dihydroxyphenyl acetic acid was determined spectrophotometrically after preceding reaction with Arnow's nitrite-molybdate reagent (10 g. No-nitrite and 10 g. Na-molybdate dissolved in 100 ml. distilled water).

TABLE I

Quantity of 3,4-dihydroxyphenyl acetic acid excreted in urine after administration of gelatin capsules with 150 mg. rutin in polyethylene glycol solution:

3,4-DIHYDROXYPHENYL ACETIC ACID ($\gamma$Ml.)

| Subject | (1) Capsule without xanthine derivative | (2) Capsule with xanthine derivative |
|---|---|---|
| A | 17.5 | 40.0 |
| | 27.0 | 57.5 |
| | 37.5 | 63.7 |
| | 50.0 | 100.0 |
| B | 47.5 | 90.0 |
| C | 28.0 | 50.0 |
| Total | 207.5 | 401.2 |
| Average value | 34.6 | 66.9 |

From this table it can be seen that resorption of rutin from polyglycol solutions is increased by approximately 100% by the resorption agent.

EXAMPLE 9

Prednisolone

Prednisolone is also a compound sparingly soluble in water. Proof of the resorption promoting effect of the xanthine derivatives was demonstrated in vitro. A membrane model served as the resorption model in Dibbern's resomat, as described in Dibbern, H. W., and Scholz, G. H., Arneim., Forsch. 19, 1140–1145 (1969).

Conduct of test 25 ml. of distilled water were placed in the inner container of the resomat (phase A), and 100 ml. of water in the outer container (phase C). The lipophilized polyamide membrane (phase B) between the aqueous phases had a pore size of 15$\mu$ diammeter.

For the comparative resorption experiments prednisolone was dissolved in polyethylene glycol 400 once with and once without xanthine derivatives.

Solution 1 (without xanthine derivatives)

| | Mg. |
|---|---|
| Prednisolone | 50 |
| Dissolved in polyethylene glycol 400 | 2500 |

Solution 2 (with xanthine derivatives)

|  | Mg. |
|---|---|
| Prednisolone | 50 |
| β-hydroxypropyltheobromine | 200 |
| β-hydroxypropyltheophylline | 200 |
| Dissolved in polyethylene glycol 400 | 2500 |

The solution to be examined was put into phase A. Then every 15 minutes phase C was replaced by distilled water and the prednisolone content in phase C was measured spectrophotometrically.

When solution 1 was used the prednisolone was measured directly at 240 nm. When solution 2 was used the prednisolone test with isoniazid according to Weichselbaum and Margraf was used, because the xanthine derivatives hindered a direct measurement of the prednisolone.

TABLE II

Permeation of prednisolone from polyethylene glycol solutions through a lipophilized membrane.

(1) Without resorption agent
(2) With resorption agent.

| Time (min.) | Prednisolone content (γ in 100 ml.) | |
|---|---|---|
|  | Solution 1 | Solution 2 |
| 15 | 382 | 764 |
| 30 | 326 | 477 |
| 45 | 305 | 496 |
| 60 | 229 | 410 |
| 75 | 191 | 380 |
| 90 | 191 | 365 |
| 105 | 172 | |
| 120 | 153 | |

90 minutes after the start of the resorption test 1268γ more prednisolone from solution 2 had diffused through the membrane than from solution 1 (without resorption agent). Particularly striking is the resorption-increasing effect of the xanthine derivatives at the beginning of the test.

Formation of a complex with xanthine derivatives gives a permeation increase of approximately 80% from prednisolone.

We claim:
1. A liquid medicinal preparation contained in a gelatin capsule comprising a difficultly soluble medicament selected from the group consisting of grieseofulvin, spironolactone, L-3-methoxy-(1-hydroxy - 1 - phenyl-isopropylamino)-propionphenone hydrochloride, testosterone, rutin and prednisolone dissolved in a solution of an effective resorption-enhancing quantity of a hydrophilizing xanthine compound selected from the group consisting of

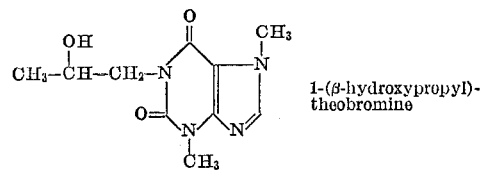

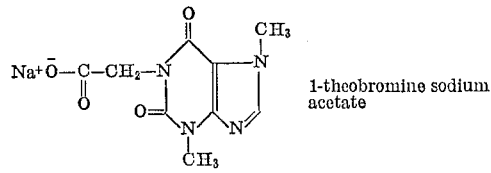

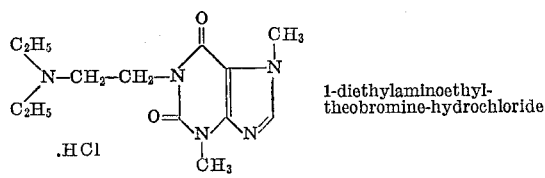

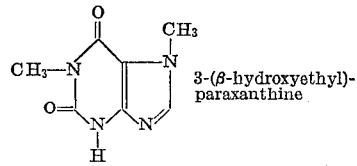

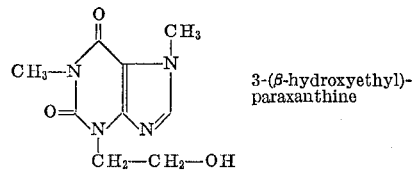

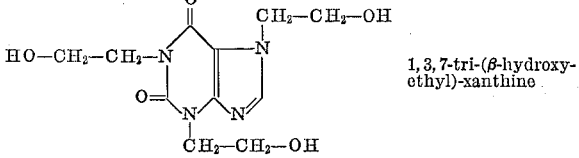

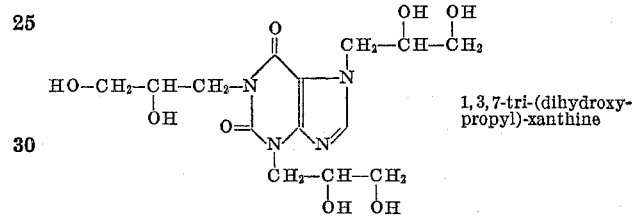

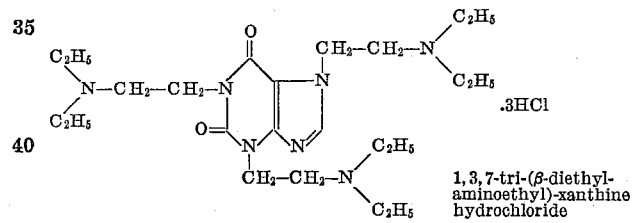

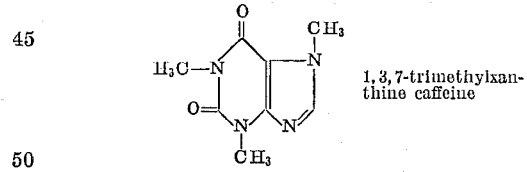

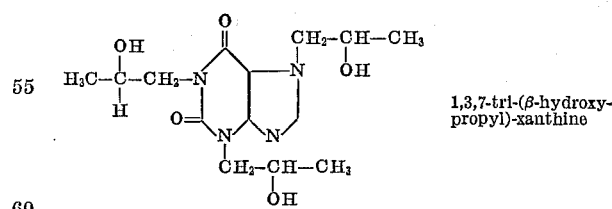

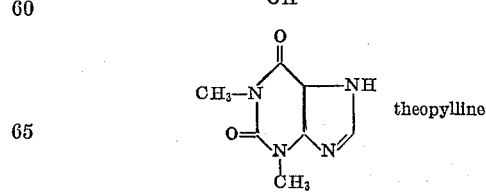

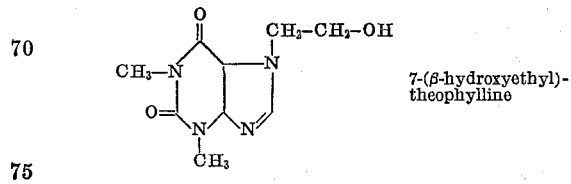

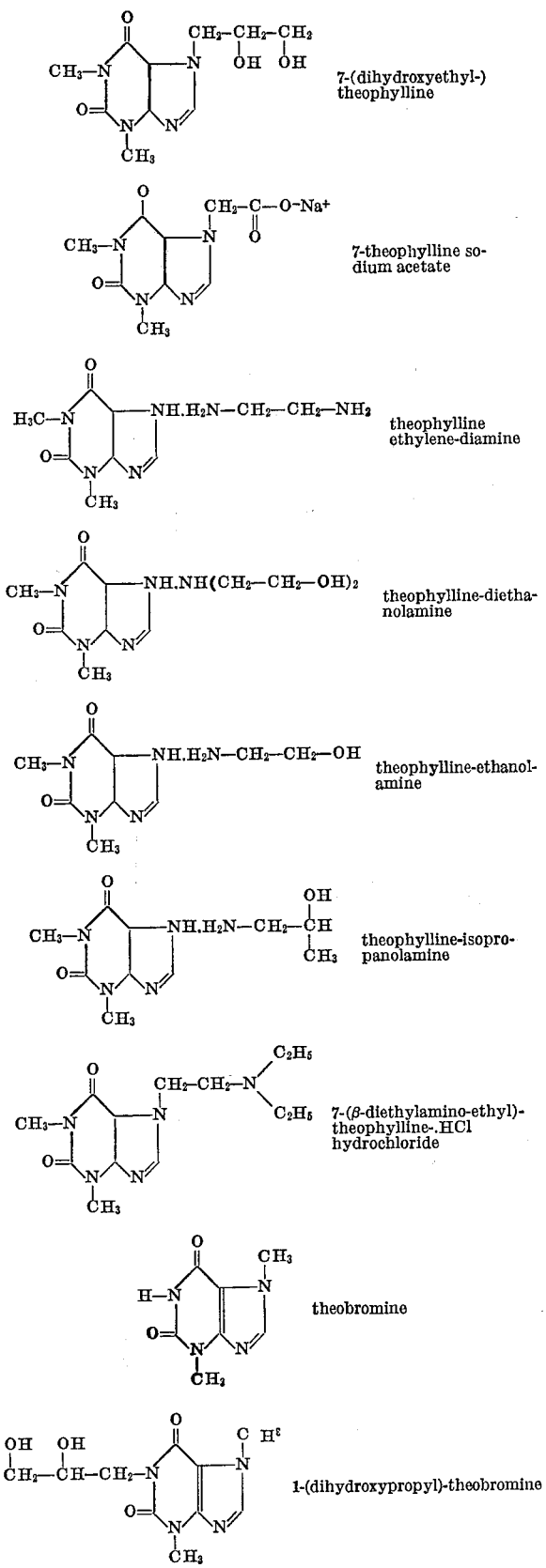

molecular weights between 106 and 8862, (b) polypropylene glycols of the formula

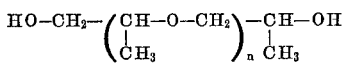

wherein $n$ is a whole number between 1 and 150 with molecular weights between 134 and 8800 and (c) mixtures of (a) and (b), adapted for oral administration by swallowing intact and characterized by increased resorption of said difficultly soluble medicament in the alimentary tract over and above the increased resorption of said difficultly soluble medicament obtained with polyethylene glycol per se.

2. The liquid medicinal preparation of claim 1 wherein said difficultly soluble medicament is griseofulvin, said xanthine compound is a mixture of 7-(dihydroxypropyl) theophylline and 1-(β-hydroxypropyl)-theobromine and said poly (lower alkylene glycol) is a mixture of polyethylene glycols.

3. The liquid medicinal preparation of claim 1 wherein the difficultly soluble medicament is spironolactone, said xanthine compound is a mixture of 1-(dihydroxypropyl)-theobromine and 7-(dihydroxypropyl)-theophylline and said poly (lower alkylene glycol) is a polyethylene glycol.

4. The liquid medicinal preparation of claim 1 wherein the difficultly soluble medicament is L-3-methoxy-ω-(1-hydroxy-1-phenyl-isopropyl - amino)-propiophenone hydrochloride, said xanthine compound is 7-(β-diethylaminoethyl)-theophylline hydrochloride and said poly (lower alkylene glycol) is a polypropylene glycol.

5. The liquid medicinal preparation of claim 1 wherein the difficultly soluble medicament is testosterone, said xanthine compound is 1,3,7-tri-(dihydroxy-propyl)xanthine, and said poly (lower alkylene glycol) is a mixture of a polyethylene glycol and poly propylene glycol.

6. The liquid medicinal preparation of claim 1 wherein the difficultly soluble medicament is griseofulvin, said xanthine compound is theophylline-diethanolamine and said poly (lower alkylene glycol) is a polyethylene glycol.

7. The liquid medicinal preparation of claim 1 wherein the difficultly soluble medicament is rutin, said xanthine compound is a mixture of 1,3,7-tri-(dihydroxypropyl) xanthine and 1,3,7-tri-(β-hydroxypropyl) xanthine and said poly (lower alkylene glycol) is a mixture of polyethylene glycols.

8. The liquid medicinal preparation of claim 1 wherein the difficultly soluble medicament is prednisolone, said xanthine compound is a mixture of 1,3,7-tri-(dihydroxypropyl)xanthine and 1,3,7-tri-(β-hydroxypropyl) xanthine and said poly (lower alkylene glycol) is a mixture of polyethylene glycols.

9. A method of increasing resorption of a difficultly soluble medicament selected from the group consisting of griseofulvin, sprionolactone, L - 3 - methoxy-(1-hydroxy-1 - phenylisopropylamino)-propiophenone hydrochloride, testosterone, rutin and prednisolone in the alimentary tract over and above the increased resorption of said difficultly soluble medicament obtained from polyethylene glycol per se comprising injesting by swallowing intact a gelatin capsule containing the medicament dissolved in a solution of an effective resorption-enhancing quantity of a hydrophilizing xanthine compound selected from the group consisting of

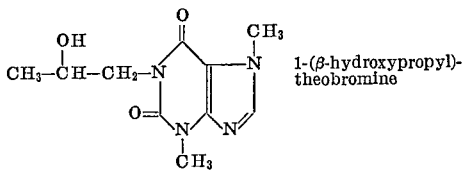

and mixtures thereof in a poly (lower alkylene) selected from the group consisting of (a) polyethylene glycols of the formula

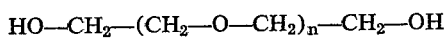

wherein $n$ is a whole number between 1 and 200 with

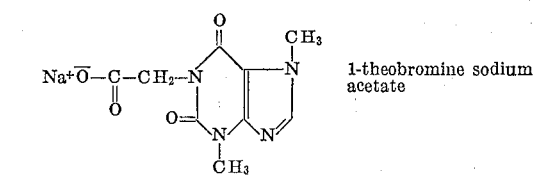 1-theobromine sodium acetate

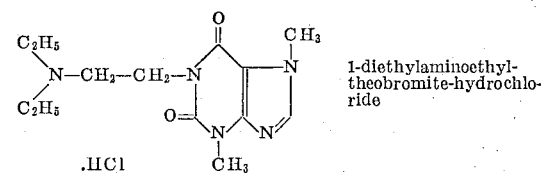 1-diethylaminoethyl-theobromite-hydrochloride

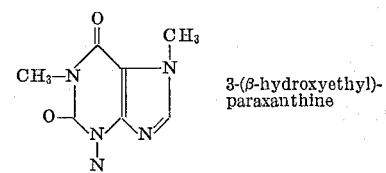 3-(β-hydroxyethyl)-paraxanthine

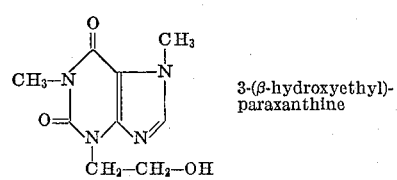 3-(β-hydroxyethyl)-paraxanthine

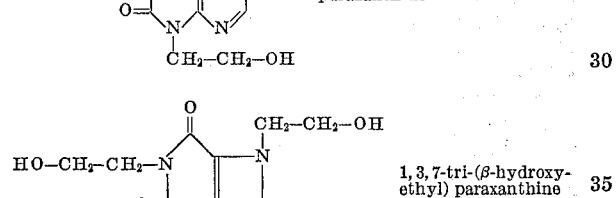 1,3,7-tri-(β-hydroxyethyl) paraxanthine

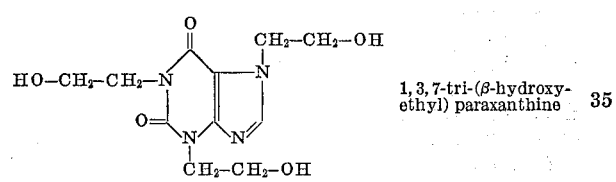 1,3,7-tri-(dihydroxypropyl)-xanthine

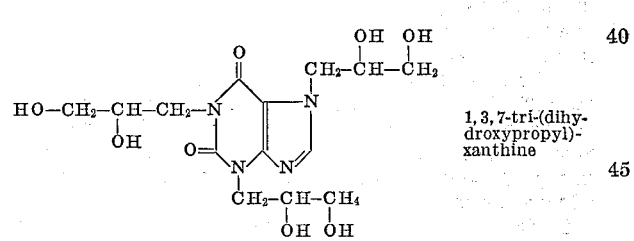 1,3,7-tri-(β-diethyl-aminoethyl)-xanthine hydrochloride

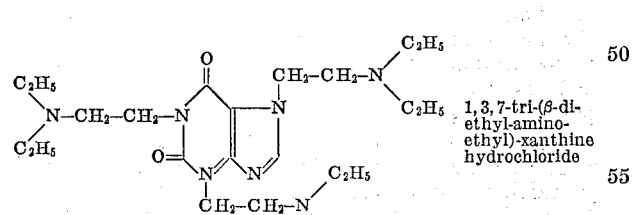 1,3,7-trimethylxanthine caffeine

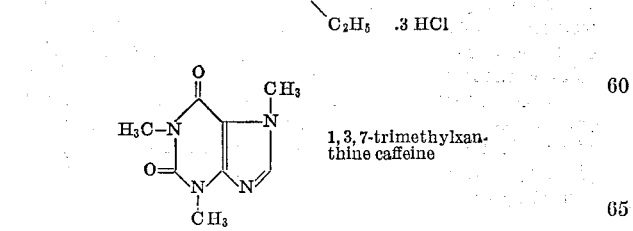 1,3,7-tri-(β-hydroxypropyl)-xanthine

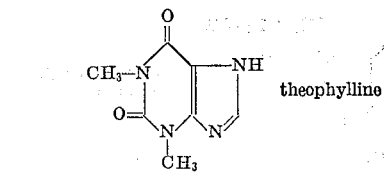 theophylline

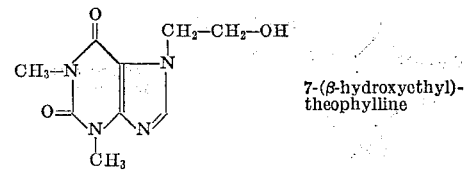 7-(β-hydroxyethyl)-theophylline

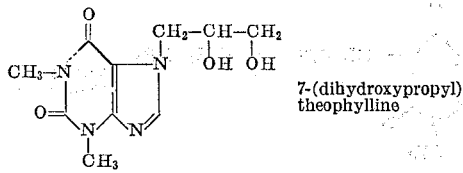 7-(dihydroxypropyl)-theophylline

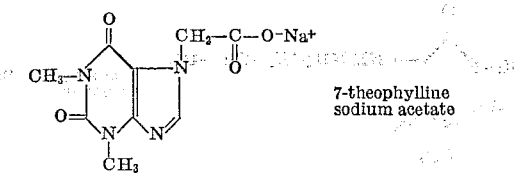 7-theophylline sodium acetate

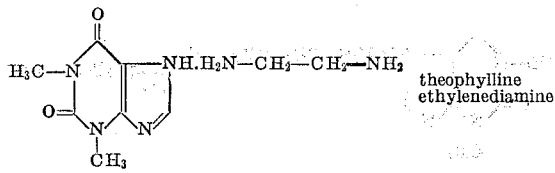 theophylline ethylenediamine

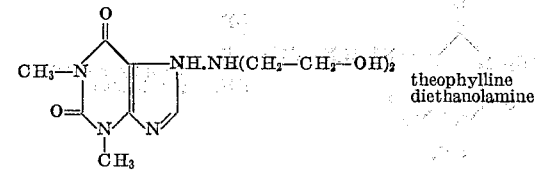 theophylline diethanolamine

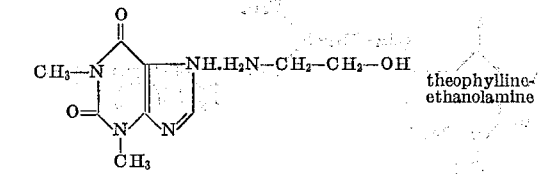 theophylline-ethanolamine

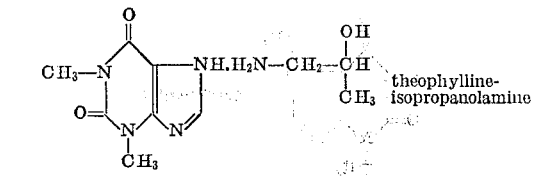 theophylline-isopropanolamine

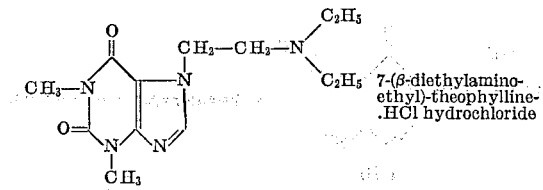 7-(β-diethylaminoethyl)-theophylline-·HCl hydrochloride

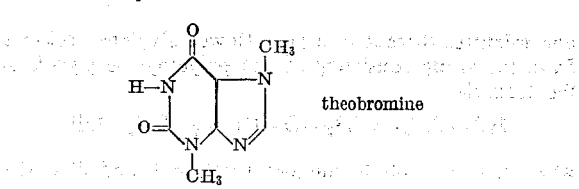 theobromine

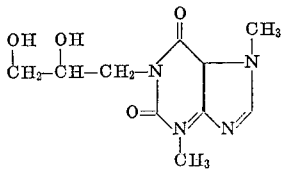

1-(dihydroxpropy-l) theobromine and mixtures thereof in a poly (lower alkylene) selected from the group consisting of (a) polyethylene glycols of the formula $$HO-CH_2-(CH_2-O-CH_2)_n-CH_2-OH$$

wherein $n$ is a whole number between 1 and 200 with molecular weights between 106 and 8862, (b) polypropylene glycols of the formula $$HO-CH_2-(CH-O-CH_2)_n-CH-OH$$
$$\quad\quad\quad\ \ CH_3 \quad\quad\quad\quad CH_3$$

wherein $n$ is a whole number between 1 and 150 with molecular weights between 134 and 8800 and (c) mixtures of (a) and (b).

References Cited

UNITED STATES PATENTS

| | | | |
|---|---|---|---|
| 2,415,312 | 2/1947 | Thompson et al. | 424—182 |
| 2,538,127 | 1/1951 | Saunders et al. | 424—253 X |
| 2,698,822 | 1/1955 | Halpern et al. | 424—182 |
| 2,765,256 | 10/1956 | Beals et al. | 424—182 |
| 2,850,429 | 9/1958 | Gulesich et al. | 424—253 X |
| 2,854,378 | 9/1958 | Buckwalter | 424—253 X |
| 2,975,099 | 3/1961 | Goyan et al. | 424—253 X |
| 3,077,436 | 2/1963 | Kohlstaedt et al. | 424—253 X |
| 3,325,472 | 6/1967 | Sackler | 424—182 X |
| 3,440,320 | 4/1969 | Sackler | 424—182 X |

FOREIGN PATENTS

| | | | |
|---|---|---|---|
| 678,353 | 1/1964 | Canada | 424—253 |

OTHER REFERENCES

Chiou et al.: J. Pharm. Sci. 58(12):1505–1510, December 1969, "Preparation and Dissolution Characteristics of Several Fast-Release Solid Dispersions of Griseofulvin."

SHEP K. ROSE, Primary Examiner

U.S. Cl. X.R.

424—182, 253, 358; 206—84, 256, 253